United States Patent
Vandewalle et al.

(10) Patent No.: US 7,275,681 B2
(45) Date of Patent: Oct. 2, 2007

(54) METHOD AND DEVICE FOR PROCESSING DATA FOR CUSTOMIZING AN APPLICATION OF A PORTABLE COMMUNICATION DEVICE, FOR EXAMPLE A SMART CARD

(75) Inventors: Jean-Jacques Vandewalle, Marseilles (FR); Eric Vetillard, Valbonne (FR)

(73) Assignee: Gemplus, Gemenos (FR)

( * ) Notice: Subject to any disclaimer, the term of this patent is extended or adjusted under 35 U.S.C. 154(b) by 418 days.

(21) Appl. No.: 10/482,375

(22) PCT Filed: Jul. 2, 2002

(86) PCT No.: PCT/FR02/02291

§ 371 (c)(1),
(2), (4) Date: Jul. 1, 2004

(87) PCT Pub. No.: WO03/005311

PCT Pub. Date: Jun. 16, 2003

(65) Prior Publication Data

US 2004/0245331 A1   Dec. 9, 2004

(30) Foreign Application Priority Data

Jul. 2, 2001   (FR)   ................................. 01 08718

(51) Int. Cl.
*G06F 17/00*   (2006.01)
*G06K 5/00*   (2006.01)
*G06K 19/06*   (2006.01)
(52) U.S. Cl. ............... 235/375; 235/380; 235/492
(58) Field of Classification Search ............... 235/441
See application file for complete search history.

(56) References Cited

U.S. PATENT DOCUMENTS

| | | | | | |
|---|---|---|---|---|---|
| 4,829,169 | A | * | 5/1989 | Watanabe | 235/492 |
| 4,965,802 | A | * | 10/1990 | Shinagawa | 235/380 |
| 5,410,690 | A | * | 4/1995 | Kawata | 707/104.1 |
| 6,014,748 | A | * | 1/2000 | Tushie et al. | 726/9 |
| 6,220,510 | B1 | * | 4/2001 | Everett et al. | 235/380 |
| 6,233,730 | B1 | * | 5/2001 | Todd et al. | 717/108 |
| 6,240,426 | B1 | * | 5/2001 | Beyda et al. | 707/201 |
| 6,484,937 | B1 | * | 11/2002 | Devaux et al. | 235/380 |
| 6,678,753 | B1 | * | 1/2004 | Tanaka | 235/380 |

FOREIGN PATENT DOCUMENTS

| | | |
|---|---|---|
| EP | 0 430 257 A | 6/1991 |
| WO | WO98/52161 A | 11/1998 |
| WO | WO99/19846 A | 4/1999 |

OTHER PUBLICATIONS

International Search Report dated Jul. 2, 2001 for PCT/FR02/02291.

* cited by examiner

*Primary Examiner*—Jared J. Fureman
(74) *Attorney, Agent, or Firm*—Buchanan Ingersoll & Rooney PC

(57) ABSTRACT

The customization or initialization of the application, for example in a programmable smart card, uses minimum integrated code. A device for preparing customizing or initializing data to be transmitted to the card creates a concatenation of information elements in respective adjacent data blocks in accordance with a convention recognized by a communication device, without explicit field specification. On reception of a data sequence, the card code identifies the information elements according to their size and their position in the flow.

21 Claims, 4 Drawing Sheets

METHOD AND DEVICE FOR PROCESSING DATA FOR CUSTOMIZING AN APPLICATION OF A PORTABLE COMMUNICATION DEVICE, FOR EXAMPLE A SMART CARD

BACKGROUND OF THE INVENTION

The invention concerns a customisation or initialisation method and device for portable communicating devices such as smart cards.

With the coming of open or closed programmable smart cards, it is possible to have said smart cards execute service applications, that is to say executable software programs, coming from various sources. To that end, a programmable card comprises rewritable memory areas for storing one or more applications according to its use, and a processor able to execute such applications.

These service applications, also known by the term "applets", come in the form of complex programs, generally designed by means of high-level languages such as JavaCard, C++, Visual Basic, etc. Each service application comprises an "applications" part which provides the execution of the program in normal mode, and an "administrative" part which is used only at an initial stage for customising the application to the holder of the card. The stored data which constitute the software means of this administrative part are designated "administrative code", or "customisation code". This code can occupy up to several tenths of the whole of the code forming the application. Within the context of the invention, the term "customisation" also comprises any other similar process to be executed in an application, such as parameter initialisation.

The customisation code is used in particular for the loading into the card of data specific to the user, so that they can be read and used if necessary during normal execution of the application. Conventionally, the on-board customisation code in a smart card or other portable communicating device must provide the following functions:

dialogue according to an established protocol with a customisation program outside the card—a distinction is then made of the on-card customisation code, contained in the rewritable memory area, and the off-card customisation code, contained for example in a remote terminal or a server;

recognition of instructions for identifying and loading fields of data intended to contain values specific to the customisation; and loading of these customisation values into corresponding registers in the memory area of the card.

FIG. 1 illustrates in a simplified manner a few steps in the conventional process for loading customisation data from the outside into respective storage fields of a programmable card, during customisation of an application of this card. In the example, the card is connected by a terminal to a server or remote terminal which fills in the fields by means of an off-card customisation code.

For each field in the card to be filled in, the off-card customisation code comprises a first instruction, intended for the on-card customisation program, which indicates the designated specific field. The on-card customisation code must recognise each of these instructions in order to select the designated field and act accordingly. This recognition necessitates a decoding instruction specific to each field, which must be stored with the on-card customisation code.

Next, the off-card customisation code transmits the personal data to be written into the previously designated field. Upon reception of these data, the on-card customisation code executes the instructions necessary for loading them into a designated register according to the preceding instruction.

Once the first field has been loaded in this way, the process is repeated in an identical manner for each of the other fields. Thus, in the example of FIG. 1, n personal information elements are loaded into respective fields of the card, each being preceded by a specific instruction which must be identified by the on-card customisation code.

By way of example, the process for customising an application intended for a medical services tracking card may fill in the following fields: field 1=surname, field 2=forename, field 3=social security number, field 4=height, field 5=weight, etc. Similarly, the process for customising another application, for example intended for a bank card, will fill in the following fields: field 1=personal identification number (PIN), field 2=maximum number of code input attempts, field 3=authorised weekly debit limit, field 4=bank code, field 5=branch code, etc.

The instructions relating to each field must not only identify it, but also indicate the form of the data contained (number and type of characters, formatting, etc.).

As these information elements are specific to each application, it follows that each application stored in a card must have its specific customisation code. The space occupied by this on-card customisation code increases with the number of applications loaded, and can occupy in total several tenths of the memory area of the card dedicated to the applications.

To sum up, this conventional method suffers from the following drawbacks:

it adapts with difficulty to remote customisations, since the method generally requires an exchange of a large number of commands, which can be very difficult to provide on a slow network; and the customisation commands must be coded in all the applications of the card, which occupies a large memory area in the card.

SUMMARY OF THE INVENTION

In view of the above, the invention proposes a novel approach to the problem of customising an application, in particular when said application is contained in a portable communicating device such as a smart card.

More particularly, the invention provides, according to a first aspect, a method of preparing customisation or initialisation data for transmission to a portable communicating device, for example a smart card, the data comprising a number of information elements, each assigned to a field used by the device, characterised in that the preparation consists of creating a concatenation of the information elements in contiguous respective data blocks organised according to a convention recognised by the communicating device, with no explicit field designation.

Preferably, the data blocks are formatted according to a number of pre-established types, the number of bytes used for writing an information element into the block assigned to it being a function of the type of this block. A number of aforementioned types can be envisaged, including at least one fixed type consisting of a fixed number of bytes and a variable format consisting of a variable number of bytes, this number being specified in the block.

The data can be transmitted in encrypted form.

According to a second aspect, the invention concerns a method for customising or initialising an application in a portable communicating device, for example a smart card, the customisation/initialisation comprising the reception of data coming from an external source in order to extract, from these data, information elements to be written into respective fields, characterised in that it consists of accepting as an input said data in the form of a concatenation in which said information elements are defined by contiguous respective blocks, organised according to a convention recognised by said external source and said communicating device, with no explicit field designation, each received information element of said concatenation being identified according to the type and position of its data block in said concatenation.

Advantageously, each information element is extracted by reference to the type of data block in which it is contained, the type of each block for each field being established by the convention. Preferably, each information element extracted from the concatenation is transferred into a portion of storage for the corresponding field in the communicating portable device.

In the embodiments envisaged, the method comprises the filling in of each field with the corresponding value in a corresponding address of the communicating portable device, by the steps of:

storing, at an initial stage, said convention in order to know the order of appearance of the fields in said concatenation and the type of block in which the corresponding value is contained;

storing the concatenation;

and for each filling in of a field:

sending a command for extracting the value by designation of the type of the data block in which it is contained, the extraction being carried out from the first byte, or from the byte following the last byte extracted previously, of said concatenation; and transferring said extracted value to a portion of memory of the portable device assigned to the corresponding field.

According to a third aspect, the invention concerns the implementation of the method according to the second aspect in a smart card.

According to a fourth aspect, the invention concerns a device for preparing customisation or initialisation data for transmission to a portable communicating device, for example a smart card, the data comprising a number of information elements, each assigned to a field used by said device, characterised in that it comprises means for creating a concatenation of said information elements in contiguous respective blocks organised according to a convention recognised by said communicating device, with no explicit field designation.

According to a fifth aspect, the invention concerns a device for customising or initialising an application in a portable communicating device, for example a smart card, the customisation/initialisation comprising the reception of data coming from an external source in order to extract, from these data, information elements to be written into respective fields, characterised in that it comprises means for accepting, as an input, the data in the form of a concatenation in which said information elements are defined by contiguous respective data blocks, organised according to a convention recognised by said external source and said communicating device, with no explicit field designation, and means for identifying and extracting each received information element of said concatenation according to the type and position of its corresponding data block in said concatenation.

According to a sixth aspect, the invention concerns a communicating device, characterised in that it incorporates the device according to the fifth aspect.

This communicating device can more specifically be a smart card.

The optional characteristics of the invention, presented within the context of the method according to the first three aspects, apply mutatis mutandis to the device and system according to the last four aspects.

BRIEF DESCRIPTION OF THE DRAWINGS

The invention and the advantages which ensue therefrom will emerge more clearly from a reading of the following description of preferred embodiments, given purely by way of non-limiting examples with reference to the accompanying drawings, in which.

DETAILED DESCRIPTION

Figure 1:
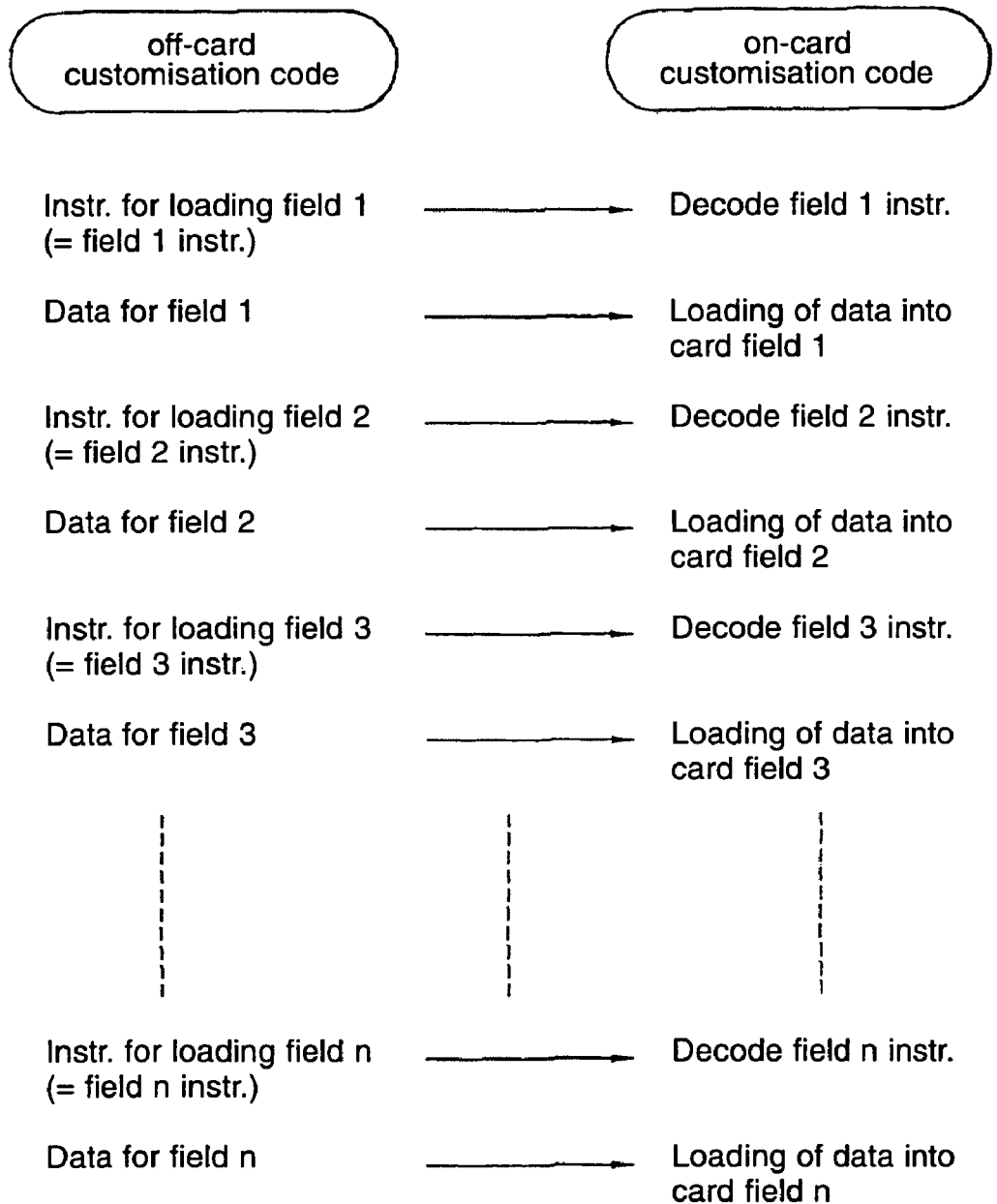
FIG. 1, already described, depicts some of the instructions transmitted to a smart card during customisation of an application, in particular for filling in personal data fields.
Figure 2:
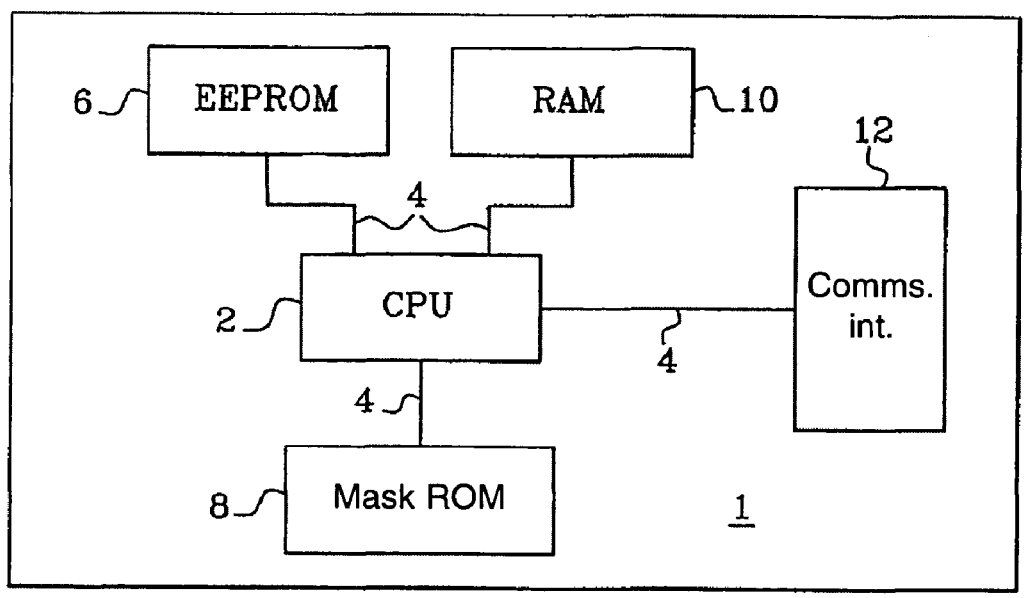
FIG. 2 is a simplified block diagram of the main elements of an "open" programmable smart card.

Before dealing with the specific features of customisation in accordance with the invention, the general architecture of an open programmable smart card will be described with reference to FIG. 2. At the heart of the card 1 there is situated a microprocessor (CPU) 2 which provides all the internal management functions of the card, as well as execution of the applications which are programmed therein. The microprocessor is connected by an internal bus system 4 to three types of memory:

a programmable memory of the electrically erasable ROM (EEPROM) type 6. This memory is intended to be loaded with one or more service applications capable of being executed by the microprocessor 2;

a memory of the mask ROM type 8, containing all the code and values of an internal management software program of the card. These data are written during manufacture of the chip. The content of the mask ROM memory 8 is very strongly linked to the hardware means of the smart card, the code normally being designed by the manufacturer of the card; and a memory of the RAM type 10 intended for the storage of temporary data, such as register contents, code blocks to be loaded into the microprocessor, etc.

The internal bus 4 is furthermore connected to a communication interface 12 which constitutes an input and output port with respect to the outside world, and which provides the electrical power supply of the card 1. This interface can be in the form of connection pads intended to engage with respective contacts of a reader, and/or an antenna in the case of a so-called contactless card. The communication interface 14 is used among other things for bidirectional data exchange with a terminal provided for loading an application into the EEPROM memory 6.

The general concept of the invention will be described with reference to FIGS. 3 and 4. In the following description, the communicating portable device is a smart card of the type described with reference to FIG. 2. It should be understand however that this description can be transposed to any other type of communicating portable device.

Figure 3:
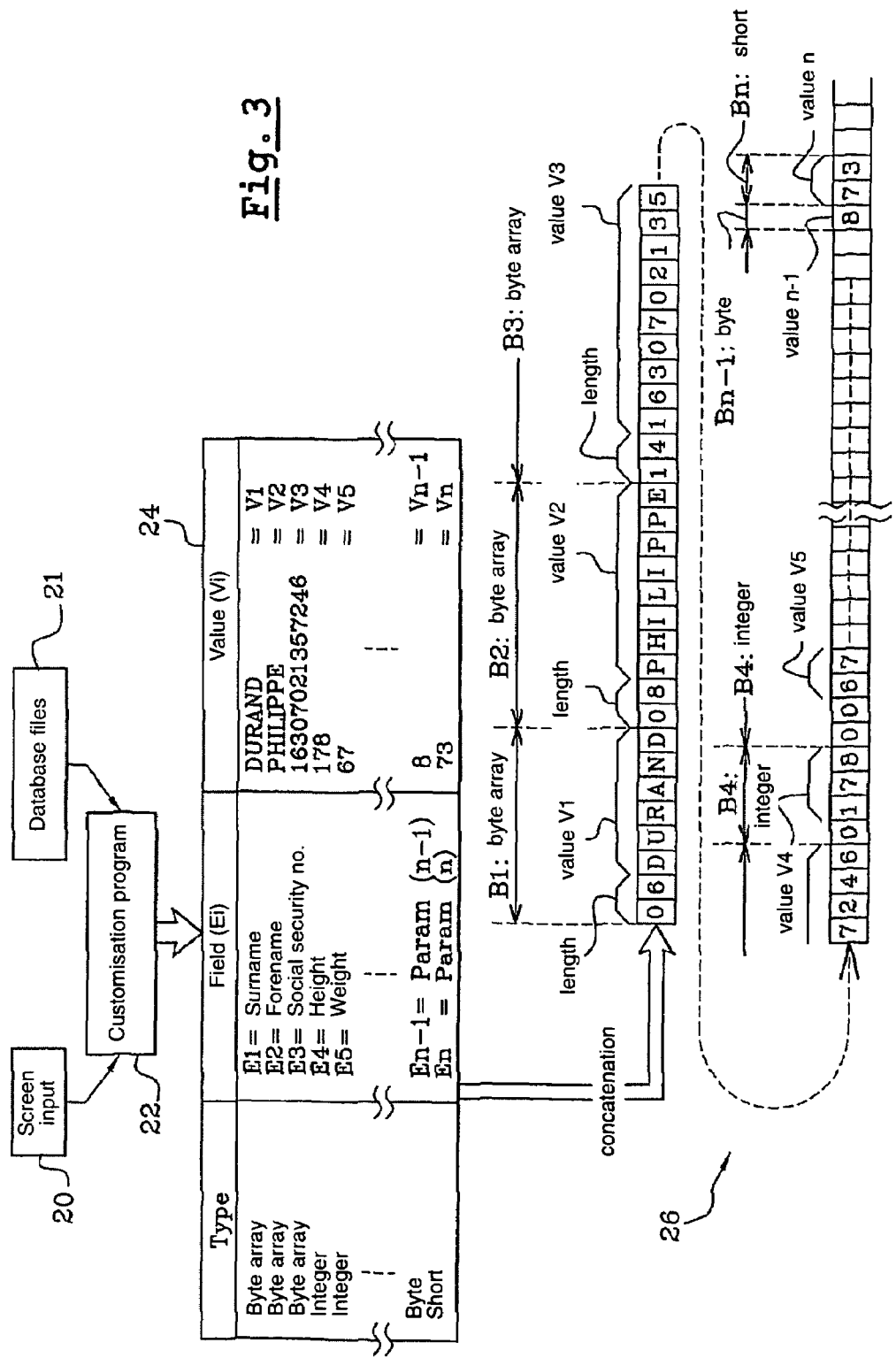
FIG. 3 is an explanatory diagram showing how personal data in a databank file appear when presented in the form of a concatenation of characters, in accordance with the invention.

FIG. 3 illustrates the preparation of the customisation data by an external centre for the card, for example a server or a remote terminal. The data personal to a card holder are established therein in various ways. In the example, these data have two possible sources:

- a local station for direct input on a screen 20, said screen possibly being integrated with a card reader terminal. In this case, the data can be written directly by the holder by filling in an on-screen questionnaire; and
- a file of personal information specific to the holder, coming from a database 21.

The data coming from these sources are processed by a software customisation module 22 in order to be arranged and formatted thereby according to a format pre-established by the customisation protocol laid down with the on-card program forming the subject of the customisation.

The customisation module 22 produces in electronic form a set of personal information elements V1 to Vn which constitute the data grouped together in corresponding fields E1 to En. In the figure, this set of information elements is depicted in the form of a table 24 with n different fields, numbered 1 to n, the first five of which are: surname, forename, social security number, height and weight of the card holder.

With each field Ei (i being a number between 1 and n) there is associated a value Vi, that is to say the corresponding personal data item (for example "Durand" for the field "Surname"). As shown in the table 24, the values Vi can be numeric or alphabetic according to the information to be supplied. A classification, called "type", is applied to each value Vi according to the length thereof in terms of bytes, in accordance with the following table:

TABLE 1

Correspondence between type and length in bytes.

| Type | Length in bytes |
| --- | --- |
| Byte Array | >4 (non-deterministic) |
| Integer | 4 (deterministic) |
| Short | 2 (deterministic) |
| Byte | 1 (deterministic) |

The Byte Array type is non-deterministic in the sense that its length is not fixed; on the other hand all the other types mentioned are deterministic, their length being fixed.

When the values constitute a byte array, which is in particular the case for the first three fields E1, E2 and E3, they are prefixed by the indication of their length in bytes, this indication being coded in two bytes. Thus, for the field E1, the byte array starts with "06" in order to indicate that the value "Durand" which follows comprises six bytes (each numeric or alphabetic character occupies one byte).

For the Integer and Short types, the value contained is supplemented, if necessary, by one or two leading padding "0"s in order to obtain the set number of bytes, respectively four and two. By way of example, the field "height" being of Integer type, the value of "178" will be preceded by one "0" in order to form the block of four bytes "0178".

The values Vn−1 and Vn at the end of the table 24 are respectively of the type "byte" and "short".

In accordance with the invention, the values expressed by the types for these n fields are subjected to a concatenation operation, so as to produce a string of characters, and therefore of bytes, 26. To do this, each value Vi is first inserted in a data block Bi, which has the format defined by the type used to express this value Vi. Thus, a data block Bi for the type "byte array" comprises the aforementioned two prefix bytes followed by the bytes which make up the value Vi. The data blocks Bi for the deterministic types (integer, short, byte) are constituted by the byte or bytes of the value Vi itself, possibly with one or more padding "0"s.

Next, a concatenation of these data blocks Bi is created, with no interposition of other data.

The absence in the concatenation 26 of any explicit designation of a field Ei, such as "surname", "forename", etc., should be noted in particular.

Thus, as shown by the concatenation 26, the byte array "06DURAND", forming the block B1 for the field E1, is followed immediately by the byte array "08PHILIPPE", forming the block B2, etc.

It should be noted that the data group is more compact, on account of it not incorporating the names of the fields in front of each of the values, unlike the conventional approach.

The byte string of the concatenation 26 is transmitted in the form of a stream of bytes to the smart card of the addressee, where it will undergo a reverse operation, referred to as "deconcatenation", making it possible to extract the data in order to write them into the fields provided E1, E2, E3, . . . , En of the on-card application.

Figure 4:
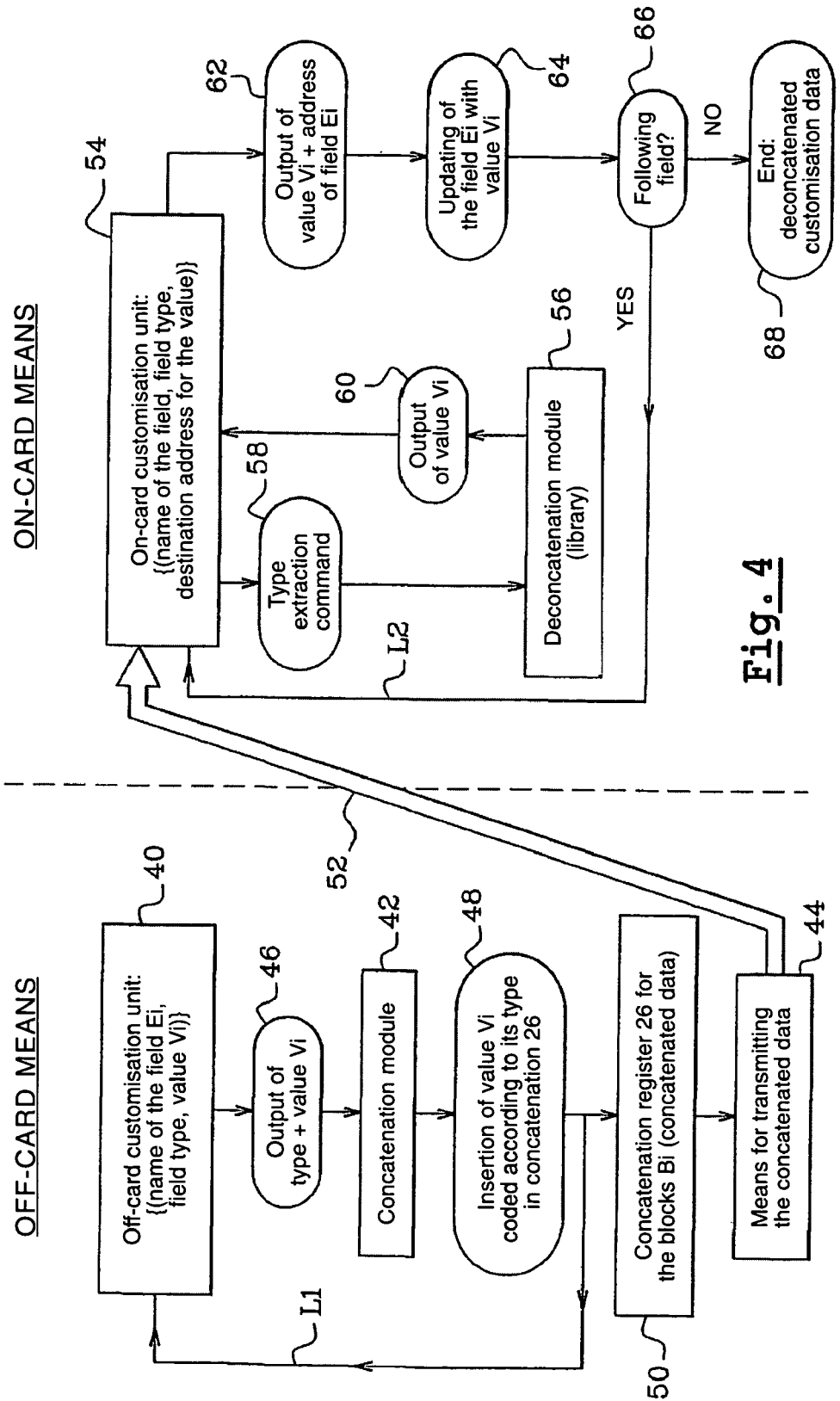
FIG. 4 is a block diagram of the functional elements involved in the concatenation of personal data and their use both outside the card and on the card.

FIG. 4 illustrates the functional means which make it possible to achieve on the one hand the concatenation of the off-card personal data and on the other hand the use of these data in serialised form at the card 1 for customising an application. These functional means are implemented with software modules distributed in the off-card and on-card memories.

In FIG. 4, the operational parts are indicated by rectangles, and the actions or results coming from these parts are indicated by tablets.

At the off-card customisation means level, there is identified a customisation unit 40 which is used in particular to establish groups of personal information according to the table 24 of FIG. 3, to use this example again, and a concatenation module 42 which cooperates with this unit 40 in order to achieve the concatenation of values 26. Transmission means 44 are provided downstream in order to provide the transportation of the concatenation of values 26 to the card.

In operation, the off-card customisation unit creates, for each field Ei, a grouped set of three elements: the name of the field, its type, and the value which has to be written therein.

For each field called up, starting with the first E1, the customisation unit sends to the concatenation module 42 the type and the value 46. From these information elements, the concatenation module will create a block of bytes, the number of which will be laid down by the type, according to Table 1 above. This block will consist of the values themselves and any prefix data indicating the number of bytes in the case of a byte array type and the aforementioned padding "0"s. It should be noted that the block can comprise an arbitrary number of bytes, including a single one (the byte type case).

The first data block corresponding to the first field is then inserted 48 at one end of a register 50, such as a FIFO type buffer memory, which allows reading of the bytes sequentially in the order of appearance in the block.

Next, the process is repeated in the same way for the following field (loop back L1). Any following block thus obtained is recorded with the first byte situated at the position which immediately follows that of the last byte of the preceding block.

After insertion of the last data block in the register 50, said register contains the concatenation 26 (that is the serialised data) as depicted in FIG. 3.

Upon achieving the customisation as regards the card 1, the serialised data in the register 50 are transferred to the transmission means 44 in order to next be transmitted by a link 52 to this card. The implementation of the transmission means and the link is conventional, being a local link on serial or parallel cable, or a wireless link by infrared or radio beam, or else a link between off-card and on-card remote terminals by telephone line on an Internet type network.

Upon reception of the concatenation of values 26, said values are stored in a register on the card (or possibly in proximity to the card) observing the order of sequence of the bytes.

The use of these on-card data is provided by a customisation unit 54 which cooperates with a deconcatenation module 56 (also designated by the term "library"). It should be noted that these data transmitted to the card are application data and not commands.

Like the unit 40, the on-card customisation unit 54 is used to establish a group of elements for each field. In this case, the group comprises two elements which are common with those of the off-card customisation unit 40, namely the name of the field and its type, for each field E1, E2, E3, . . . , En.

It should be noted that there exists an exact agreement between these elements situated off card and on card. More particularly, there is found at the level of the off-card 40 and on-card 54 customisation units an identity as regards:

the fields E1, E2, . . . , En forming the subject of the concatenation;

the order in which these fields are taken into account for the concatenation and for the deconcatenation respectively off card and on card; and for each field, the type of value contained: byte array, integer, short or byte. However, when the type associated with a field is a byte array, the customisation unit 54 has no need to know its length, this information being specified in the concatenation data 26 received.

This agreement can be pre-established by a convention or it can be obtained by writing the code relevant to this aspect consistently between the off-card and on-card parts.

Besides these two elements (field and type), the aforementioned group of elements of the on-card customisation unit comprises, for each field, a destination address for the value associated with this field. This address, which therefore constitutes the third element of the group, can be the first address value of a memory intended for storing the value in the card.

The on-card customisation process then consists, firstly, of extracting for each field the corresponding value contained in the concatenation data 26.

To do this, the customisation unit 54 sends to the deconcatenation module 56 a command 58 for extracting the data type corresponding to the field under consideration. In response, the deconcatenation module 56 extracts, from the concatenation data 26, the bytes of the block which constitute the value of the field. These bytes are identified by the concatenation module simply by the fact that:

on the one hand, the blocks of bytes which constitute the successively processed fields follow one another in the concatenation data 26, which makes it possible to determine the starting point for the extraction, and on the other hand, the indication of the type by the command 58 makes it possible to determine the number of bytes to be extracted.

Thus, for the first field E1 according to the example of FIG. 3, the type extraction command 58 consists of requesting the deconcatenation module 56 to extract the byte array type. Being the first command 58, the module positions itself for reading the head of the concatenation data 26 and, in accordance with the process for extracting a byte array, reads the first two bytes, that is "06". The module is thus informed that it must deliver the following six bytes of the concatenation data, that is those which encode the value "DURAND". This value is sent as the output 60 from the deconcatenation module 56 to the customisation unit 54. In response, the latter creates and sends 62 a set of data consisting of this value and its destination address in order to fill in the field. This set is processed by internal management means in order to achieve the storing of this value at the agreed location on the card. The updating (or creation) 64 of the field E1, corresponding to the surname, with the value "DURAND" is thus achieved, at the memory location of the card provided for this personal information.

The customisation unit 54 next determines whether there is a following field 66. If such is the case, it performs a loop back L2 in order to go to the processing of this field.

For the following field E2, the deconcatenation module 56 is also informed that it must extract a byte array. The block of bytes concerned is identified as the one situated immediately following the last byte extracted for the preceding field E1. The value "PHILIPPE" in this forename field is thus extracted by an identical process and undergoes the same processing for outputting a value 50 to the customisation unit 54, for outputting said value with the address of the second field 62, and for updating the field 64 in order to write the value in the memory location of the card provided for the forename.

The starting point of each operation for extracting a value from the serialised data 26 can be fixed by an address pointer according to conventional techniques.

When all the values of the n fields are thus extracted and stored in the card at the agreed addresses, the deconcatenation process is finished.

One of the remarkable aspects of the invention lies in the fact that the off-card concatenation module 42 and the on-card deconcatenation module 58 are completely generic in the sense that they are independent of specific features of the customisation of a particular service application. This is because these modules do not have to take into account the meaning or purpose of the values they manage. Their function is simply to concatenate them (concatenation module 42) and extract them (deconcatenation module 56) as blocks of bytes whose size is fixed by the assigned type.

In this way, the off-card concatenation module 42 can be installed in any terminal having the task of transmitting customisation data to a device. A terminal thus equipped can then benefit from the advantages of sending customisation data in serialised form for all the service applications managed.

At card level, one and the same deconcatenation module 56 can serve different customisation units 54, in particular in the case of an open or closed multiservice card comprising a number of applications, each of which comprises its own customisation unit.

The concept of the invention having been described apart from the considerations specific to the formalism of the software means, for reasons of simplification, these aspects will now be dealt with within the context of an example based on the JavaCard language, commonly used for programming applications on smart cards. The JavaCard language is a derivative of the Java language, which takes account of the hardware resource limitations of the cards, in particular as regards their memory capacity. It is however clear that persons skilled in the art can easily transpose and adapt the elements of this description to any other language used in the field.

As regards the software means, implementation of the concatenation takes place at the following levels:
- execution of the customisation code on a machine outside the card, this being for example a customisatipn machine or a remote server;
- coding of the customisation data which result therefrom into a byte stream (cf. data 26 in FIG. 3), using a single and portable format;
- transmission to the card of the byte stream which results therefrom; and
- decoding of the byte stream provided by the card using an automated process, implemented by the deconcatenation module 54.

At the off-card (server) level, the software means comprise a library which allows a user to create and initialise the same objects as those used in the card application, for example files, personal identification codes, and keys. These means also comprise a software tool (concatenation module 42) which can input these objects (after initialisation) and transform them into a byte stream 26, which is coded in a single and transportable manner.

At the level of the card 1, the software means comprise a generic reading tool (deconcatenation module 56) whose function is to decode the generic part of the byte stream. For each object type which can be created, a specific function is provided for decoding the part of the byte stream which describes this particular object type.

The implementation of the software means is a function of the type of customisation machine and the type of card used.

By way of example, the concatenation (and, conversely, the deconcatenation) can be based on a concatenation format adapted to the "JavaCard" language.

When a customisation machine is used in a secure environment, the byte stream does not necessarily have to be made secure by encryption, and the raw data, including a few checksum values, can be transmitted on the line between the customisation machine and the card.

When a remote server is used (for example via the Internet), the communication must preferably be made secure, and the byte stream will then be encrypted and signed (for example using a protocol of the type known by the acronym MAC, for "Message Authentication Coding"). In certain cases, it is possible to encrypt only the sensitive part of the data stream.

With an open card in which applications can be written by third parties and loaded into the card, the main library of the card, that is the deconcatenation module, will be included in the software operating tool, normally in ROM fixed memory, but the libraries which decode the content of each object, that is the customisation unit 54, will be contained in the application which defines the object.

With a closed card, the whole of the card library will be integrated in the software operating tool and the set of potential objects will be fixed.

There will now be considered an application in the "JavaCard" language which can be customised by a remote server through a network. For reasons of simplification, this will concentrate on the particular case of an object created for the personal identification code (PIN Object). In the example, the data transmitted are:
- the maximum number of code writing attempts permitted;
- the maximum size of the PIN code;
- the actual size and the value of the PIN code;
- the initial number of possible attempts.

The idea is then to define two additional methods in the PIN object: one for writing the PIN data and the other for reading these PIN data.

A method for writing PIN data into a stream on the server can be as follows:

Public void writeStream (ObjectOutput out) throws IOException

```
{
    out.writeByte(maxTries);
    out.writeByte(maxSize);
    out.writeByte(actualSize);
    out.write(PINValue,        (short)0,  actualSize);
    out.writeByte(ratif);
}
```

This method will be designated "writeStream( )".

In a corresponding manner, a method for reading PIN data from a stream (on the card) can be as follows:

Public void readStream(ObjectInput in) throws IOException

```
{
    maxTries =   in.readByte( );
    maxSize =    in.readByte( );
    actualSize = in.readByte( );
    in.read(PINValue, (short)0, actualSize);
    ratof = in.readByte( );
}
```

This method will be designated "readStream( )".

With the "JavaCard" software means, the byte stream which results therefrom must contain all the information described by the user, as well as system information intended to be used by the generic decoder on the card, that is:
- the AID of the set in which the class is defined. (An AID is an identification code assigned by an international standards organisation for listing applications.); and
- the token of the class within the set. (A token is a way of identifying a class by a hexadecimal number rather than by a name, in order to save on-card memory space.)

Consequently, if a PIN personal code is used under the following conditions:
- definition in the set com.gemplus.util (AID=A0 00 00 00 18 34);
- the class has the token 0x21 in this set;
- the PIN personal code is defined with three attempts at most, a maximum size of six, a PIN value of "1234" and a standard maximum number of attempts of three;

then the corresponding byte stream will be:

| | |
|---|---|
| A0 00 00 00 18 34 | AID set |
| 21 | Token class |
| 03 | Maximum number of attempts |
| 06 | Maximum size |
| 04 01 02 03 04 | Size and value of PIN |
| 03 | Size and value of PIN |

In other words, the data stream of the concatenation will appear as: A0 00 00 00 18 34 21 03 06 04 01 02 03 04 03.

This data stream can be produced on a server by the method "writeExternal( )" defined above, then encrypted, and next sent to the card, where it will be decoded by the method "readExternal( )" defined above.

The basic idea which has just been described consists of defining a system for representing data in a card and a protocol for loading them into the card. From this context, a number of variants can be envisaged:

1. Instead of producing the data from a simulator, it is possible to use a "master" card which is customised according to a conventional method, and then to obtain the external data from this master card. The data which result therefrom can then be transmitted to other cards. Thus, in accordance with this variant, the "master" card fulfils the function of the off-card means, and all the customisation operations are carried out by cards.

2. The serialised data 26 can be subjected to encryption according to a given cryptographic protocol during their transportation or their storage in memory.

3. The serialised data 26 can be backed up on sites for the purposes of archiving the content of the personal information of a card or performing new customisations.

4. After having produced the backup (cf. variant 3), it is possible to keep the applications, known by the term "applets", in a secure storage place, for example by carrying out an encryption according to variant 2. The data can also be used for executing an application on another device from the server.

5. A backup system defined in paragraph (2) can also be used at the end of life of a card as a diagnostic or fraud detection tool.

6. The secure backup system defined in paragraph (2) above can be used for exchanging data between cards in a secure manner.

It should be noted that, in one implementation of the invention based on the JavaCard language, it is possible to rely partly on data concatenation techniques already established for this language. These techniques are known in fields very different from those of customisation of applications on portable devices, namely techniques for data backup and task sharing between computers.

The invention can be used both for customisation on a production site, before issue, and for remote customisation, after issue.

In all cases, whether an open or closed card is concerned, the following technical effects are obtained:

a reduction in the size of the customisation code on the card. On the card, the amount of code necessary for the customisation is greatly reduced for a number of reasons. First, a large part of code is generic and included in the system, only one physical location. Next, the code which is specific to each object type is fairly small, and needs to be present only at a single place in the card;

facilitation of remote customisation. Since there is only a single byte stream to be transferred, the level of interactivity during the customisation is reduced, and it becomes possible to work with a network even of low quality. In addition, the total amount of data to be exchanged tends to decrease.

Furthermore, it will be appreciated that:

the majority of the customisation code resides outside the card, said card containing only the generic code necessary for decoding the stream;

the single byte stream can be made more compact than the conventional customisation scripts, and its structure is very simple, which greatly facilitates transportation of the stream to the card;

the customisation machine or the server can keep a detailed archive of the customisation. The customisation code can be merged into the code of the server transparently;

the byte stream is independent of the card type used, which can increase the potential for reuse of the customisation scripts;

in the case of a "Java" server and a "JavaCard" card, the server can use the software in the card for carrying out initialisation, which substantially reduces the potential risk of errors.

The invention claimed is:

1. A method for transmitting customization or initialization data to a portable communicating device, the data comprising a plurality of information elements, each assigned to a field used by said device, comprising the steps of:

creating a concatenation of said plurality of information elements in contiguous respective data blocks organized according to a convention recognized by said communicating device, with no explicit field designation, and transmitting said concatenation of said plurality of information elements to said portable communicating device.

2. A method according to claim 1, wherein the data blocks are formatted according to a number of pre-established types, and wherein the number of bytes used for writing an information element into the block assigned to it is a function of the type of block.

3. A method according to claim 2, wherein said types comprise at least one fixed type consisting of a fixed number of bytes and a variable format consisting of a variable number of bytes, with said variable number being specified in the block.

4. A method according to claim 1, wherein the data are transmitted in encrypted form.

5. The method of claim 1, wherein said portable device is a smart card.

6. A method for customizing or initializing an application in a portable communicating device, said customization/initialization comprising the steps of:

receiving data from an external source, extracting, from these data, information elements to be written into respective fields, and accepting as an input data in the form of a concatenation in which said information elements are defined by contiguous respective blocks, organized according to a convention recognized by said external source and said communicating device, with no explicit field designation, each received information element of said concatenation is identified according to the type and position of its data block in said concatenation.

7. A method according to claim 6, wherein each information element is extracted by reference to the type of data block in which it is contained, and wherein the type of each block for each field is established by said convention.

8. A method according to claim 7, wherein said types comprise at least one fixed type consisting of a fixed number of bytes and a variable format consisting of a variable number of bytes, wherein said variable number is specified in the block.

9. A method according to claim 6, wherein each information element extracted from said concatenation is transferred into a portion of storage for a corresponding field in the communicating portable device.

10. A method according to claim 6, further including the process of filling in each field with the corresponding value in a corresponding address of the communicating portable device, by the steps of:
storing said convention in said portable communications device in order to know the order of appearance of the fields in said concatenation and the type of block in which the corresponding value is contained;
storing said concatenation;
for each filling in of a field:
sending a command for extracting the value by designation of the type of the data block in which it is contained, the extraction being carried out from the first byte, or from the byte following the last byte extracted previously, of said concatenation; and
transferring said extracted value to a portion of memory of the portable device assigned to the corresponding field.

11. The method according to claim 6, wherein said device is a smart card.

12. A device for transmitting customization or initialization data to a portable communicating device, the data comprising a plurality of information elements, each assigned to a field used by said device, comprising:
means for creating a concatenation of said plurality of information elements in contiguous respective blocks organized according to a convention recognized by said communicating device, with no explicit field designation, and
means for transmitting said concatenation of said plurality of information elements to said portable communicating device.

13. A device according to claim 12, wherein the data blocks are formatted according to a number of pre-established types, and wherein the number of bytes used for writing an information element into the block assigned to it is a function of the type of said block.

14. A device according to claim 13, wherein said types comprise at least one fixed type consisting of a fixed number of bytes and a variable format consisting of a variable number of bytes, wherein said variable number is specified in the block.

15. The device of claim 12, wherein said portable device is a smart card.

16. A device for customizing or initializing an application in a portable communicating device, said customization/initialization including the reception of data from an external source in order to extract, from these data, information elements to be written into respective fields, comprising
means for accepting, as an input, said data in the form of a concatenation in which said information elements are defined by contiguous respective data blocks, organized according to a convention recognized by said external source and said communicating device, with no explicit field designation, and
means for identifying and extracting each received information element of said concatenation according to the type and position of its corresponding data block in said concatenation.

17. A device according to claim 16, wherein each information element is extracted by reference to the type of data block in which it is contained, and wherein the type of each block for each field is established by said convention.

18. A device according to claim 17, wherein said types comprise at least one fixed type consisting of a fixed number of bytes and a variable format consisting of a variable number of bytes, wherein said variable number is specified in the data block.

19. A device according to claim 16, further comprising means for filling in each field with a corresponding value in a corresponding address of the communicating portable device, including:
means for storing said convention in said portable communications device in order to know the order of appearance of the fields in said concatenation and the type of block in which the corresponding value is contained;
means for storing said concatenation;
means for sending a command for extracting the value by designation of the type of block in which it is contained, the extraction being carried out from the first byte, or from the byte following the last byte extracted previously, of said concatenation; and
means for transferring said extracted value to a portion of memory of the portable device assigned to the corresponding field.

20. A device according to claim 16, wherein said device is physically incorporated in said communicating portable device.

21. A device according to claim 20, wherein said portable device is a smart card.

* * * * *